(12) United States Patent
Fontaine (10) Patent No.: US 9,619,082 B2
(45) Date of Patent: Apr. 11, 2017

(54) METHOD AND A DEVICE FOR CONTROLLING AT LEAST ONE PIECE OF EQUIPMENT

(71) Applicant: AIRBUS HELICOPTERS, Marignane (FR)

(72) Inventor: Lionel Fontaine, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 34 days.

(21) Appl. No.: 14/735,191

(22) Filed: Jun. 10, 2015

(65) Prior Publication Data
US 2015/0378513 A1    Dec. 31, 2015

(30) Foreign Application Priority Data

Jun. 27, 2014    (FR) ...................................... 14 01461

(51) Int. Cl.
*G06F 3/041*    (2006.01)
*G06F 3/0488*    (2013.01)
(Continued)

(52) U.S. Cl.
CPC .......... *G06F 3/0418* (2013.01); *G06F 3/0412* (2013.01); *G06F 3/0416* (2013.01);
(Continued)

(58) Field of Classification Search
None
See application file for complete search history.

(56) References Cited

U.S. PATENT DOCUMENTS 6,072,473 A    6/2000 Muller et al.
8,633,913 B1    1/2014 Raghu et al.
(Continued)

FOREIGN PATENT DOCUMENTS

EP    0562929    9/1993
EP    1360572    12/2011
(Continued)

OTHER PUBLICATIONS

French Search Report for FR 1401461, Completed by the French Patent Office on Feb. 18, 2015, 6 Pages.
(Continued)

*Primary Examiner* — Nicholas Lee
(74) *Attorney, Agent, or Firm* — Brooks Kushman P.C.

(57) ABSTRACT

A control method and device comprising a touch screen, the touch screen displaying at least one touch control zone for transmitting a command to a piece of equipment. The touch screen is continuously unlocked. The touch screen is in a passive state presenting a first display mode when no control zone has been touched by a person. On being touched, the touch screen is put into an active state imparting a second display mode thereto that is distinct from the first display mode. After the touch screen has passed from the passive state to the active state, all of the requested commands are validated jointly by operating validation means, the control device transmitting at least one signal to at least one piece of equipment in order to convey the commands and the touch screen then being placed in the passive state.

20 Claims, 3 Drawing Sheets

(51) Int. Cl.
*G06F 3/0481* (2013.01)
*G06F 3/0483* (2013.01)

(52) U.S. Cl.
CPC .......... *G06F 3/0483* (2013.01); *G06F 3/0488* (2013.01); *G06F 3/04817* (2013.01); *G06F 3/04886* (2013.01); *G06F 2203/04101* (2013.01); *G06F 2203/04104* (2013.01); *G06F 2203/04803* (2013.01); *G06F 2203/04808* (2013.01)

(56) References Cited

U.S. PATENT DOCUMENTS

| | | |
|---|---|---|
| 2009/0063967 A1 | 3/2009 | Lee et al. |
| 2010/0145485 A1* | 6/2010 | Duchene .............. G05B 19/042 700/90 |
| 2013/0135202 A1 | 5/2013 | Louise-Babando et al. |
| 2013/0249829 A1* | 9/2013 | Hitosuga ................. G06F 3/041 345/173 |
| 2014/0062893 A1 | 3/2014 | Kawalkar |
| 2015/0286366 A1* | 10/2015 | Le Pors .................... G01S 7/04 345/173 |

FOREIGN PATENT DOCUMENTS

| | | |
|---|---|---|
| EP | 2587350 | 5/2013 |
| EP | 2600108 | 6/2013 |
| FR | 2853095 | 10/2004 |
| FR | 2911409 | 7/2008 |
| WO | 2007076210 | 7/2007 |
| WO | 2014095883 A1 | 6/2014 |

OTHER PUBLICATIONS

Korean Notice of Preliminary Rejection Dated Oct. 30, 2016, Application No. 10-2015-0080677, Applicant Airbus Helicopters, 4 Pages.

* cited by examiner

METHOD AND A DEVICE FOR CONTROLLING AT LEAST ONE PIECE OF EQUIPMENT

CROSS REFERENCE TO RELATED APPLICATION

This application claims priority to French patent application No. FR 14 01461 filed on Jun. 27, 2014, the disclosure of which is incorporated in its entirety by reference herein.

BACKGROUND OF THE INVENTION (1) Field of the Invention

The present invention relates to a method and a device for controlling at least one piece of equipment, and in particular it relates to a control device for an aircraft. More particularly, the control device comprises a touch screen.

The present invention thus lies in the field of man-machine touch interfaces for aircraft.

(2) Description of Related Art

Certain flight procedures require crew to interact with one or more control devices.

These control devices may involve commands that are said to be "virtual" insofar as the commands are represented by symbols displayed on a touch screen. The touch screen then embodies one or more commands that can be operated by touching the touch screen.

Such a control device may represent a combination of a plurality of conventional instruments. The touch screen then displays different commands as a function of the piece of equipment that is to be controlled. The control device is thus a multifunction device.

Touch screen control devices are particularly advantageous because of their ergonomics.

Nevertheless, movements of crew members in the aircraft can then lead to untimely interactions with such touch screen control devices. In flight, a pilot might for example exert pressure on a touch screen without meaning to, and thereby give rise to untimely operation of a piece of equipment or a system.

In order to avoid such a situation, the prior art provides various solutions.

In order to avoid involuntary interaction with a touch screen, the system may include a device for locking and unlocking the touch screen.

Although effective, unlocking a touch screen prior to each interaction can constitute an element that is disturbing for a pilot who is busy with other tasks. That method tends to increase the workload on the pilot. Under such circumstances, the pilot is more likely to commit errors, e.g. by attempting to interact with a touch screen while it is still locked.

Other devices tend to require each of the commands embodied on a touch screen to be unlocked individually.

That method can also significantly increase the workload on a pilot.

In this context, Document EP 1 964 022 discloses a method for unlocking a touch screen by moving an unlock image along a path.

Document US 2014/0062893 describes a system and a device for reducing the probability of a touch screen being activated accidentally.

Document US 2014/0062893 describes a first mode of operation by comparing a profile with a prerecorded profile, a second mode of operation that is interactive with visual feedback, and a third mode of operation where the level of performance is associated with the type of function allocated to the man-machine interface being controlled.

Document EP 1 360 572 B1 is far removed from touch screens, since it refers to a computer. That document relates to a programmable three-state icon that is displayed on a computer display. The first state corresponds to a passive state. The second state is actuated to start an action on the computer, so as to avoid initiating involuntary an action on the computer, by selecting successively the first state and the second state.

When user selection causes the action to start, the icon changes to the third state.

Document EP 2 587 350 describes a method of determining whether an order given by touching the touch screen is valid. That method determines the validity of such an action as a function of a biomechanical signature.

Document FR 2 853 095 relates to a safe man-machine interface device for a touch screen.

That document relies on the principle of a physical locking button as applied to a touch screen.

Document FR 2 911 409 describes a method and a system for enabling safe control from a touch screen.

That document suggests using three symbols for one command.

Document U.S. Pat. No. 8,633,913 B1 proposes a control and display system adapted to a touch screen having a plurality of data formats.

Documents EP 0 562 929, US 2009/063967, and EP 2 600 108 are also known.

BRIEF SUMMARY OF THE INVENTION

An object of the present invention is thus to provide a control device that makes use of an alternative method so that a control device having a touch screen takes account only of actions that are genuinely requested by a person.

In particular, the invention provides a method performed by a system comprising a control device linked to at least one piece of equipment to be controlled, the control device comprising a touch screen, the touch screen being capable of displaying at least one virtual control unit having at least one touch control zone that generates a command that is transmitted to said piece of equipment when a person touches the control zone.

The control device may thus have buttons or the equivalent for displaying a plurality of virtual control units. The term "virtual" means that the control unit does not have one or more physical buttons such as a pushbutton or a rotary knob. Commands are transmitted to the appropriate pieces of equipment by touching predetermined zones of the screen.

The touch screen may be a conventional screen. For example, the touch screen may comprise a touch panel.

Each virtual control unit may be associated with a function or with a device. For example, a virtual control unit may be used for controlling an air conditioning system.

The method is remarkable in particular in that:

the touch screen is permanently unlocked so that an operator can generate a command by touching a control zone;

the touch screen is put into a passive state imparting a first display mode to the touch screen when no control zone has been touched by a person;

the touch screen is put into an active state imparting a second display mode distinct from the first display mode to the touch screen when at least one control zone has been touched by a person;

the control device is provided with validation means, and after the touch screen has passed from the passive state to the active state, each requested command is validated jointly when said validation means are operated, said control device transmitting at least one signal to at least one piece of equipment to convey each command; and the touch screen is put into said passive state after said validation means have been operated.

This method applies to any control device having a virtual control unit, and in particular to any control device of an aircraft.

One of the drawbacks of certain prior art systems is to use a button for locking and unlocking a touch screen.

The present method goes against the prejudice that consists in believing that a touch screen must be locked in order to prevent a command being activated accidentally.

The method proposes having the touch screen permanently unlocked, which amounts to saying that its control zones can be used at any time.

In addition, certain systems propose deactivating control zones.

Unlike the logic of Document EP 1 360 572, the method of the invention proposes single validation means that make it possible, to validate all of the commands that have been issued. The method stores the commands before they are validated and thus enables commands to be added or corrected prior to being validated, should that be necessary.

Under such circumstances, the touch screen may present a first display mode in a passive state that is used whenever the touch screen has not been touched by a person. This state is said to be "passive" insofar as no command order has been issued.

In contrast, the touch screen presents a second display mode in an active state that is used when the touch screen has been touched by a person. This state is said to be "active" insofar as at least one command order has been issued by touching the touch screen.

The term "display mode" is used to designate the visual appearance imparted to at least a portion of the touch screen.

Consequently, a person can tell whether the screen is in the passive or active state merely by looking at the touch screen. The touch screen then shows the virtual control unit in the passive state by default, which means that no command has been issued.

For example, the contrast between a page displayed in the first display mode and a page displayed in the second display mode may be considerable.

In the present method, the touch screen is initially in the passive state.

During an actuation step, a person then issues a series of commands deliberately or accidentally by touching the touch screen.

When the touch screen is touched by a person, the system then passes into the active state in an automatic priming step.

Under such circumstances, the touch screen passes from the first display mode to the second display mode.

This passage from the first display mode to the second display mode is advantageous in that the crew members of an aircraft are rapidly informed that commands are waiting to be validated, for example.

At this stage, the commands are not transmitted to a piece of equipment, but they are possibly stored. The commands are thus waiting to be validated.

During a manual validation step, a person can validate all of the commands that have been issued by deliberately operating the validation means. The commands are then sent jointly to the pieces of equipment concerned. The touch screen then shows the virtual control unit in the passive state.

As a result, commands that are actually sent to at least one piece of equipment are the result of a voluntary action. The present method thus reduces the risks of any piece of equipment being activated accidentally.

Consequently, this method makes it possible to filter out untimely interactions with the touch screen, in particular a screen installed on the instrument panel of an aircraft cockpit.

This method also makes it possible to improve the reactivity with which a flight procedure involving a touch screen is executed in comparison with a system that requires unlocking, for example.

In addition, this method can tend to increase the number of procedures that are successfully executed as a result of the validation stage. The validation stage enables a person to issue a plurality of commands that are then all taken into account by the system.

The method may also include one or more of the following additional characteristics.

For example, each control zone may be displayed in the passive state and in the active state.

The control unit then presents the same control zones both in the passive state and in the active state.

Furthermore, said first display mode imparts a first visual appearance to at least a portion of the touch screen and said second display mode imparts to said portion a second visual appearance that is distinct from the first visual appearance.

By observing the portion of the display screen that can be subjected to the first display mode or to the second display mode, a person can easily determine the state of the touch screen.

The active state may be indicated in various ways. For example, certain zones of the touch screen may flash while in the active state.

In a variant, the first display mode imparts a first visual appearance to a background of the touch screen, while the second display mode imparts to said background a second visual appearance that is distinct from the first visual appearance.

The background represents the portions of the screen that do not include a control zone, for example.

Thus, the background of the touch screen may change color and/or texture between the active state and the passive state.

By way of illustration, the background of the screen may be black in the first display mode and gray in the second display mode.

Furthermore, the validation means may comprise a button situated outside the touch screen or they may be operated via voice control means. Possibly, the validation means comprise a button that is available on the instrument panel or on a control stick in the cockpit.

Nevertheless, the validation means may also be embodied by a validation zone of the touch screen. This validation zone may be outlined by a continuous line.

Consequently, the validation zone can also be modified by a change of appearance between the active state and the passive state.

When the first display mode imparts a first visual appearance to a background of the touch screen, with the second display mode imparting to said background a second visual appearance distinct from the first visual appearance, the validation zone may present the same visual appearance as the background.

For example, the validation zone may have the same color and/or the same texture as the background of the screen, both in the active state and in the passive state.

Furthermore, for the first display mode imparting a first visual appearance to a background of the touch screen and the second display mode imparting to said background a second visual appearance distinct from the first visual appearance, each control zone may optionally present a third visual appearance distinct from the first visual appearance of said background.

This characteristic seeks to make a control zone show up on the background.

Furthermore, the control device may be provided with cancellation means, and after the touch screen has been passed from the passive state to the active state, each requested command is canceled when the cancellation means are operated for a duration longer than a threshold time referred as a "long time", the touch screen then returning to the passive state.

If a person issues an erroneous command, knowingly or by accident, all of the commands are canceled by a long operation of the cancellation means. For example, the long time may be about three seconds.

In addition, or as an alternative, the control device may be provided with cancellation means, and after the touch screen has been passed from the passive state to the active state, the most recently requested command is canceled when said cancellation means are operated for a duration shorter than a threshold time referred as a "short time", and the touch screen is kept in the active state.

If a person issues an erroneous command, that command can be canceled by operating the cancellation means for a short time. By way of example, the short time may be about one second.

Under such circumstances, the same cancellation means can be used both to cancel all of the commands or to cancel only the most recently issued command.

For example, if the touch screen was operated inadvertently, a person can cancel all of the commands during a cancellation step by acting on the cancellation means for the long time, or can cancel the most recently issued command by acting on the cancellation means for the short time.

Full cancellation causes the virtual control unit to pass into the passive state. If any commands have been stored, those commands are deleted and they are not transmitted to the associated equipment.

The system is then returned to its initial display state.

The cancellation means may be in the form of buttons available on the dashboard or on control sticks of the cockpit, or they may be in the form of voice control means.

Nevertheless, it is also possible to embody the cancellation means by a cancellation zone of said touch screen. The cancellation zone may be outlined by a continuous line.

Consequently, the cancellation zone can also be modified by a change of appearance between the active state and the passive state.

When the first display mode imparts a first visual appearance to a background of the touch screen, with the second display mode imparting to said background a second visual appearance that is distinct from the first visual appearance, the cancellation zone may present the same visual appearance as the background.

For example, the cancellation zone may have the same color and/or the same texture as the background of the screen.

Furthermore, each control zone touched by a person may be surrounded with a continuous line in the active state, and each continuous line is deleted on the touch screen passing from the active state to the passive state.

By way of example, the continuous line represents a thick box, such as a rectangle with rounded corners that presents a particular visual appearance.

A person can then visually identify which control zones have been activated.

The means for signaling activated control zones may vary. For example, it is possible to increase the size of a symbol in the control zone, or to make a symbol flash, or to act on the texture and/or the color of at least a portion of the control zone.

In this context, the continuous line surrounding the control zone most recently touched by a person is deleted on cancellation means being operated, in particular for a short time.

In addition to manual cancellation means, or as an alternative, if no action is undertaken in the active state by the end of a predetermined period, each command that has been issued since passing from the passive state to the active state is canceled automatically, and said touch screen is passed into the passive state.

The cancellation step may also have an automatic mode.

If the touch screen is not touched by a person during said period, then the system returns to the passive state without transmitting any orders to the associated equipment.

If the commands issued on the virtual control unit are unintentional, or if the commands are intentional but the person is not in a position to validate them, then the commands will be canceled automatically at the end of a predetermined period of inactivity.

Such a period may be about five seconds, for example.

Nevertheless, said period may vary as a function of the mission, said mission being selected from a list of missions by a person.

Such a period may be determined during evaluations undertaken by a crew in flight.

Furthermore, the system may include air conditioning equipment and said touch screen may have a plurality of control zones including:

a control zone referred to as a "temperature zone" for setting a temperature to be obtained by using said air conditioning equipment;

a control zone referred to as a "ventilation zone" for controlling ventilation produced said air conditioning equipment; and a control zone referred to as an "operating mode zone" for requesting either manual operation or automatic operation of said air conditioning equipment.

In addition to a method, the invention also provides a control device for controlling at least one piece of equipment, the control device comprising a touch screen, the touch screen having at least one touch control zone that generates a command that is sent to the equipment when a person touches the control zone. Furthermore:

the control device does not have means for locking the touch screen in order to prevent operation of at least one control zone; and said control device includes validation means and a processor unit executing instructions stored in a storage unit in order to perform the method as described above.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Figure 1:
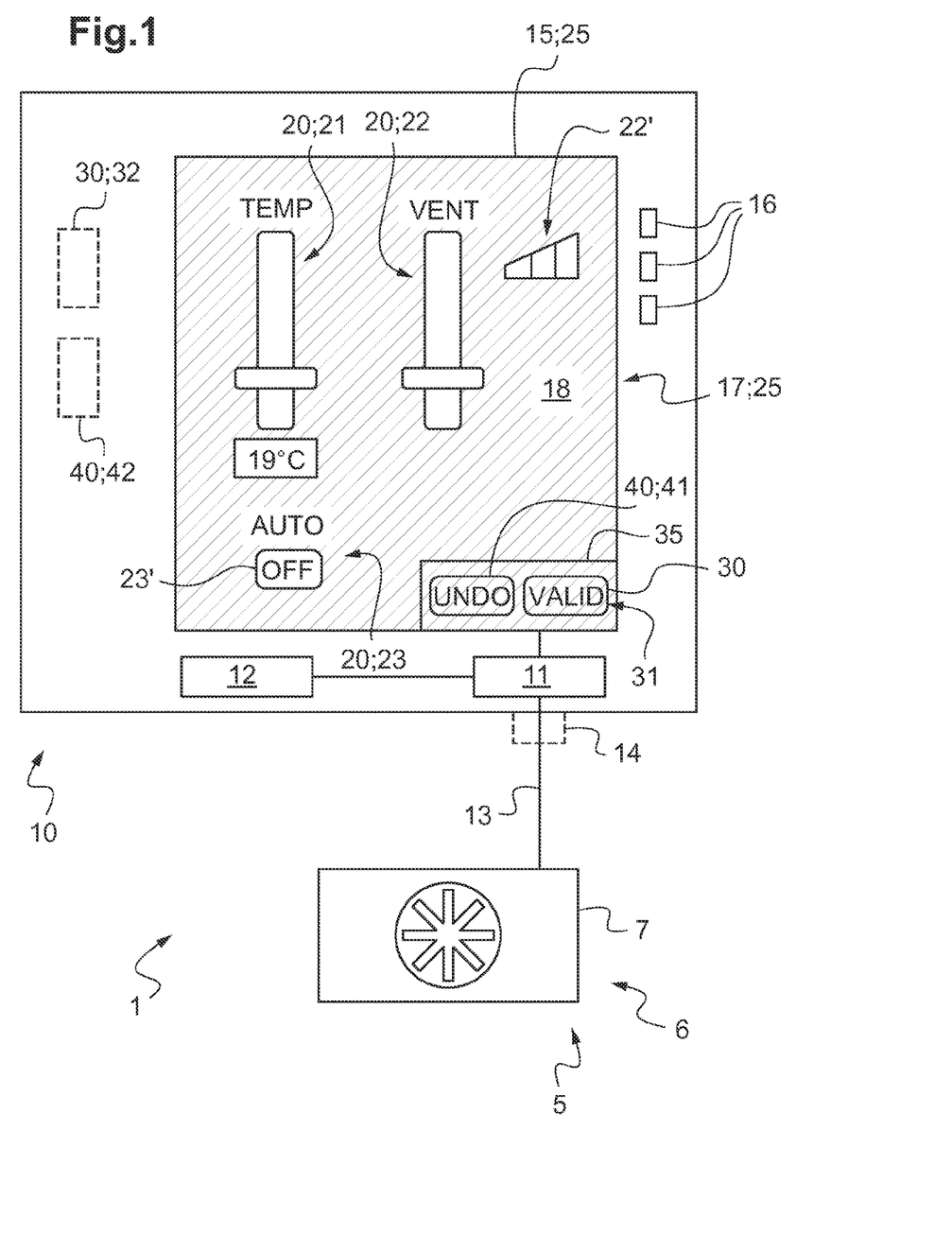
FIG. 1 is a view of an aircraft provided with a system of the invention.

FIG. 1 shows an aircraft 1 including a system 5.

The system 5 includes a man-machine interface for controlling at least one piece of equipment 6. Such a piece of equipment 6 may be air conditioning equipment 7.

The man-machine interface then includes a control device 10 connected to each piece of equipment 6 via a wired or wireless connection 13. In addition, conventional processor and interface means 4 may be interposed between the control device 10 and at least one piece of equipment 6.

The control device 10 then includes at least one touch screen 15 and a controller. The controller produces a signal to display information on the touch screen, and can generate a control signal when a person touches the touch screen.

Such a controller may have a processor unit 11 executing instructions stored in a storage unit 12 in order to display the required information on the screen and in order to generate appropriate signals when the touch screen is operated by a person. Thus, the controller determines which zones are touched by the person in order to generate the appropriate signal and transmit it to the appropriate equipment. By way of example, the processor unit may comprise a processor, an integrated circuit, a programmable system, or a logic circuit, these examples not being limiting on the scope to be given to the term "processor unit".

Thus, when a person touches the touch screen, an order may be issued to a piece of equipment in the form of a signal sent by the controller.

To keep the description brief, conventional techniques for generating images and symbols on a touch screen and for operating a touch screen are not described in detail. Likewise, the connections between the various members described represent connections that are functional and/or physical between those various members. It should be observed that numerous alternatives are described in the state of the art. Thus, connections may be wired or wireless and may involve using conventional communications systems.

The control device may have buttons 16 or the equivalent for selecting the function to be performed. The control device may cause a plurality of virtual control units 17 to be displayed on the touch screen, each virtual control unit 17 possibly being dedicated to a single application.

At least one virtual control unit 17 includes at least one touch control zone 20 for generating a command for a piece of equipment. By way of example, each control zone may be displayed continuously, regardless of the state of the virtual control unit.

For example, the virtual control unit used for controlling air conditioning equipment 7 may have a control zone 20 referred to as the "temperature zone 21" for adjusting the temperature to be obtained when using said air conditioning equipment 7. By touching the temperature zone, a person can move a slider in order to determine the temperature to be reached, which temperature is also displayed numerically.

Furthermore, the virtual control unit has a control zone 20 referred to as the "ventilation zone 22" for controlling ventilation produced by said air conditioning equipment 7. By touching the ventilation zone 22, a person can move a slider to determine the power of a fan, with a symbol 22' illustrating this power.

In addition, the virtual control unit has a control zone 20 referred to as an "operating mode zone 23" for requesting either manual operation or else automatic operation of said air conditioning equipment 7. For example, the operating mode zone 23 includes a virtual switch 23' specifying the operating mode. By pressing on the virtual switch 23', a person changes the operating mode. For example, the mention "ON" displayed on the switch means that an automatic mode of operation is active, while the mention "OFF" displayed on the switch in FIG. 1 means that the automatic mode of operation is not activated.

Independently of the nature of the equipment being controlled, the control device 10 does not have any means for locking the touch screen. A person can interact with a control zone at all times.

In contrast, the control device has manual validation means 30 to enable a person to validate at least one order.

The validation means 30 may comprise a validation button 32 situated outside the touch screen 15. Such a validation button 32 is represented by dashed lines in FIG. 1.

Nevertheless, the validation means 30 may have a touch validation zone 31 on the touch screen.

For example, this validation zone 31 is outlined by a box surrounding the mention "VALID".

The control device optionally includes manual cancellation means 40 so as to enable a person to cancel at least one order.

The cancellation means 40 may comprise a cancel button 42 situated outside the touch screen 15. Such a cancel button 42 is represented in dashed lines in FIG. 1.

Nevertheless, the cancellation means 40 may comprise a touch cancellation zone 41 on the touch screen.

For example, this cancellation zone 41 is outlined by a box surrounding the mention "UNDO".

In addition, the cancellation zone 41 and the validation zone 31 may be arranged in a box 35 situated in the bottom left-hand corner of the touch screen in the example shown in FIG. 1.

This control device 10 enables the method of the invention to be performed. This method is explained with the help of FIGS. 1 to 5.

With reference to FIG. 1, the touch screen is in a passive state 25 by default. In this passive state, no operating order is being processed. The state is thus said to be "passive". Nevertheless, the touch screen is not locked, and all of its control zones can be operated.

In the method, the controller places the touch screen 15 in the passive state 25 by displaying the virtual control unit in a first display mode.

In contrast, in an active state, the touch screen 15 responds to an order from the controller to display the virtual control unit in a second display mode distinct from the first display mode.

The terms "first display mode" and "second display mode" designate the visual appearance given to at least a portion of the screen. Thus, the first display mode imparts a first visual appearance to at least a portion of the touch screen 15, and the second display mode imparts to said portion a second visual appearance that is distinct from the first visual appearance.

In particular, each display mode may impart a particular color or texture to the background of the touch screen.

For example, the first display mode imparts a particular visual appearance to the background 18 of the touch screen 15, and the second display mode imparts a second visual appearance to the background 18 that is distinct from the first visual appearance.

In FIG. 1 in particular, the passive state is characterized by a gray background represented by shading lines.

Figure 2:
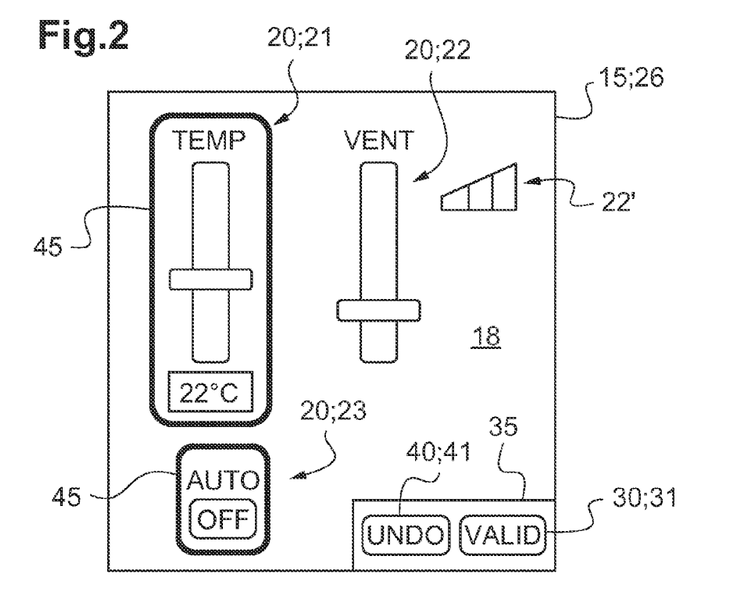
FIGS. 2 to 4 are views of a touch screen for explaining the method of the invention.

Conversely, and with reference to FIG. 2, the active state is characterized by a background that is white in color in this example.

Furthermore, the validation zone 31 and/or the cancellation zone 41 may at any time present the same visual appearance as the background.

The validation zone 31 and the cancellation zone 41 are then gray in color in the passive state, and white in color in the active state.

In contrast, and with reference to FIG. 1, the control zones 20 present a third visual appearance that is distinct from the first visual appearance of the background.

Optionally, the control zones 20 present a third visual appearance that is unvarying and that corresponds to the second visual appearance of the background. Thus, the control zones 20 are always white in color in this example.

With reference to FIG. 2, the controller places the touch screen 15 in the active state 26 by displaying the virtual control unit in the second display mode when at least one control zone 20 has been touched by a person.

For example, if a person touches the temperature zone 21, the controller changes the background color of the touch screen, of the validation zone 31, and of the cancellation zone 41.

The state of the system becomes active. The controller stores in its storage unit the orders that have been issued.

In the example of FIG. 2, a person has selected a temperature of 22° C. and has requested automatic operation of the air conditioning equipment 7, by pointing respectively to the temperature zone 21 and to the operating mode zone 23.

The controller then stores two orders, namely an order to change the temperature from 19° C. to 22° C. and an order to operate the air conditioning equipment 7 automatically.

Furthermore, the controller, in one option, surrounds each control zone 20 that has been touched by a person with a continuous line 45 in the active state 26.

A person can then see that the touch screen has been touched so as to select the two control zones shown in the example of FIG. 2.

The person can also check visually that the intended commands are valid.

If the commands coincide with that person's desires, then the stored orders can be validated manually by acting on the validation means.

For example, a person presses on the validation zone 31 in order to validate manually all of the orders that have been passed. The controller then transits at least one signal to at least one piece of equipment in order to transcribe these orders. In the example shown, the controller informs the air conditioning equipment of the temperature to be reached and of the mode of operation to be performed by sending at least one signal thereto for this purpose.

Figure 3:
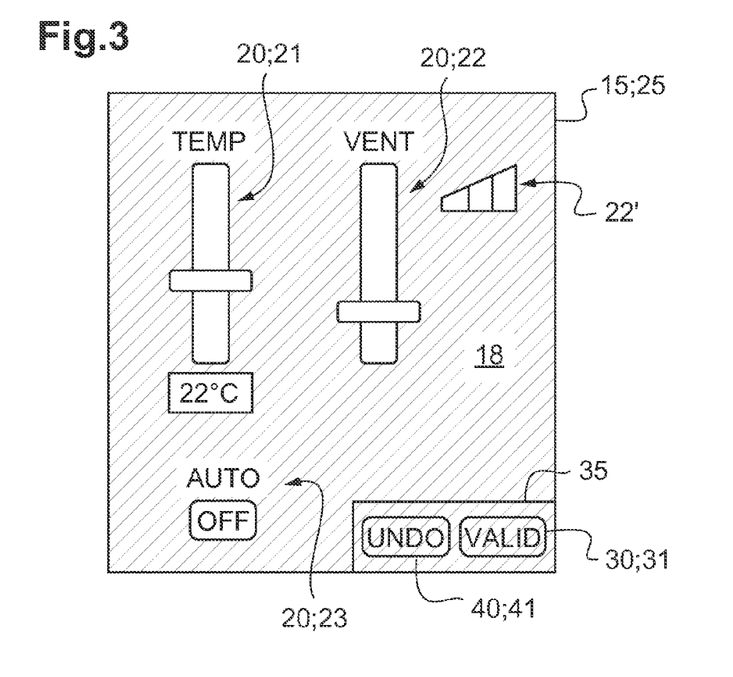

Once the orders have been passed, the controller removes all of the previously displayed boxes and continuous lines 45. Furthermore, the controller causes the units to pass to the passive state in which the virtual control unit is displayed in the first display mode, as shown in FIG. 3.

From the active state of FIG. 2, if the commands that have been passed do not match a person's desires, then that individual can also cancel one or more orders by acting on the cancellation means.

For example, the person may cancel the most recently issued order by acting on the cancellation means for a short time.

The person can thus press on the cancellation zone for a short time, e.g. about one second, in order to cancel the most recently stored order. The controller deletes the order in question from its storage unit.

Furthermore, the box surrounding the corresponding control zone is then deleted. Nevertheless, the touch screen continuously displays the virtual control unit in the second display mode.

A person can then, for example, validate the remaining orders using the procedure as described above.

Furthermore, a person can cancel all of the orders that have been given by acting on the cancellation means for a long time.

Thus, the person can also press on the cancellation zone for a long time, e.g. about three seconds, in order to cancel all of the orders that have been stored since passing into the active state. The controller then deletes all of the orders in question from its storage unit.

Furthermore, the boxes 45 surrounding the control zones involved are all deleted. Finally, the controller causes the virtual control unit to pass into the passive state by causing it to be displayed in the first display mode.

Figure 4:
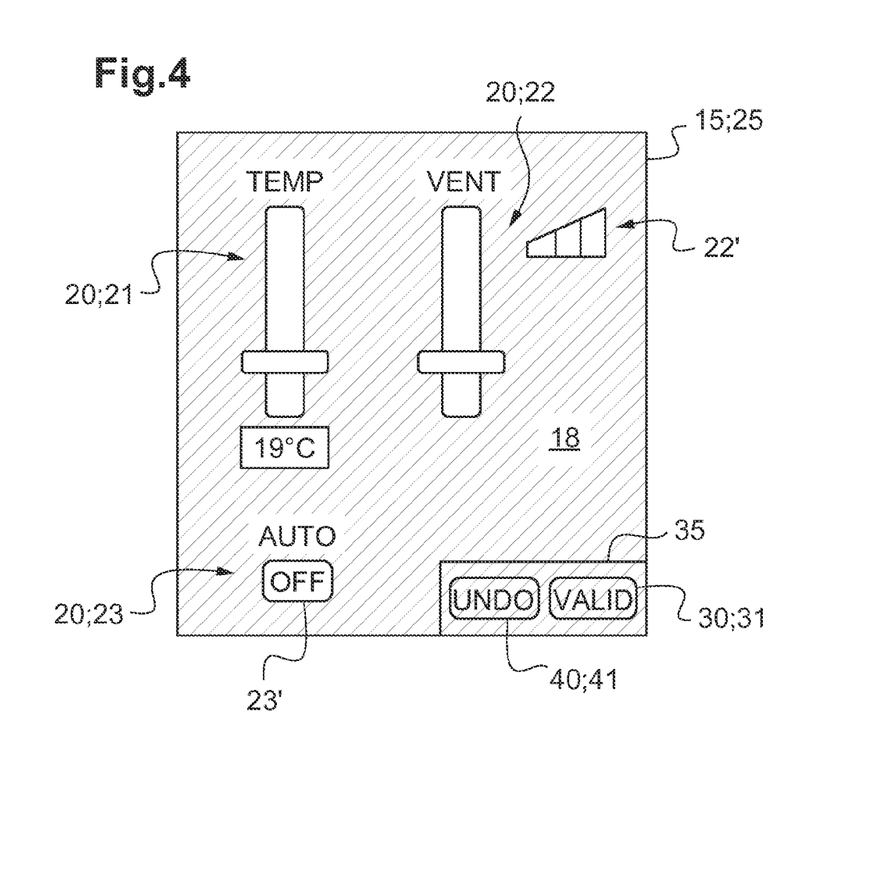

Under such circumstances, the virtual control unit returns to its initial state as shown in FIG. 4.

Finally, the controller can also cancel the orders that have been given and can place the virtual control unit back in the passive state under its own authority.

In the active state 26 shown in FIG. 2, if no action is taken by the end of a predetermined period TPS, then the controller automatically cancels all of the commands issued since passing from the passive state to the active state. The procedure described in the context of cancellation means operated for a long time is then applied.

Figure 5:
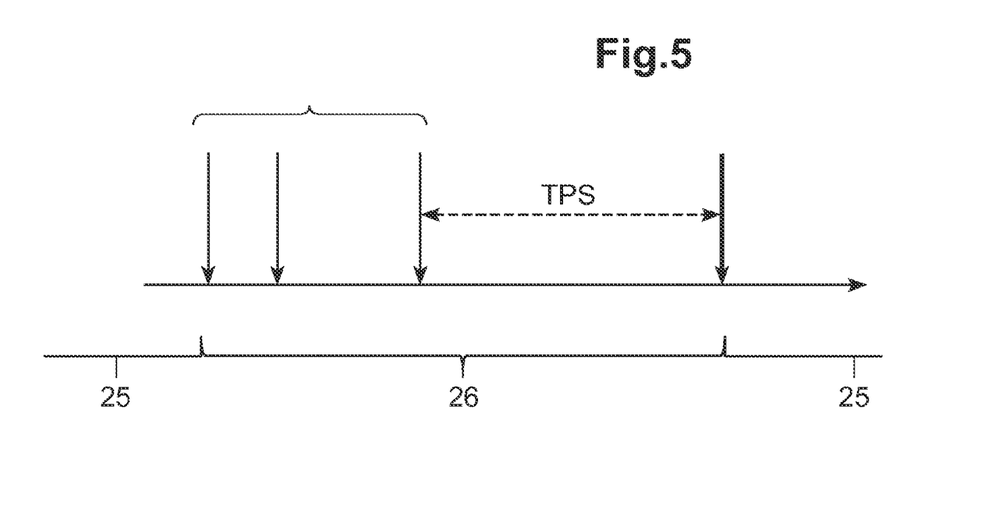
FIG. 5 is a view explaining an automatic cancellation step.

With reference to FIG. 5, the controller may use a timer.

Initially, the virtual control unit is in the passive state 25.

On the first command, the virtual control unit passes into the active state 26. Each press on a control zone of the touch screen then causes the timer to be reinitialized.

If this timer nevertheless reaches the predetermined period TPS, then the system is returned to its passive state.

All of the commands issued during the current active mode are then canceled and the virtual control unit returns to the passive state.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method performed by a system comprising a control device linked to at least one piece of equipment to be controlled, the control device comprising a touch screen, the touch screen being capable of displaying at least one virtual control unit having at least one touch control zone that generates a command that is transmitted to the at least one piece of equipment when a person touches the at least one control zone, wherein:

the touch screen is permanently unlocked so that an operator can generate the command by touching the at least one control zone;

the touch screen is put into a passive state imparting a first display mode to the touch screen when no control zone has been touched by a person;

the touch screen is put into an active state imparting a second display mode distinct from the first display mode to the touch screen when at least one control zone has been touched by a person;

the control device is provided with validation means, and after the touch screen has passed from the passive state to the active state, each requested command is validated jointly when the validation means are operated, the control device transmitting at least one signal to at least one piece of equipment to convey each command; and the touch screen is put into the passive state after the validation means have been operated;

wherein, in the active state, if no action is taken by the end of a predetermined period, each command that has been issued since passing from the passive state to the active state is canceled automatically, and the touch screen is passed into the passive state.

2. The method according to claim 1, wherein the first display mode imparts a first visual appearance to at least a portion of the touch screen and the second display mode imparts to the portion a second visual appearance that is distinct from the first visual appearance.

3. The method according to claim 2, wherein the first display mode imparts a first visual appearance to a background of the touch screen and the second display mode imparts to the background a second visual appearance that is distinct from the first visual appearance.

4. The method according to claim 1, wherein the validation means are embodied as a validation zone of the touch screen.

5. The method according to claim 1, wherein for the first display mode imparting a first visual appearance to a background of the touch screen and the second display mode imparting to the background a second visual appearance different from the first visual appearance, the validation means comprises a validation zone that presents a same visual appearance as the background.

6. The method according to claim 1, wherein for the first display mode imparting a first visual appearance to a background of the touch screen and the second display mode imparting to the background a second visual appearance different from the first visual appearance, each control zone presents a third visual appearance that is distinct from the first visual appearance of the background.

7. The method according to claim 1, wherein the control device is provided with cancellation means, and after the touch screen has been passed from the passive state to the active state, each requested command is canceled when the cancellation means are operated for a duration longer than a threshold time, the touch screen then returning to the passive state.

8. The method according to claim 1, wherein the control device is provided with cancellation means, and after the touch screen has been passed from the passive state to the active state, a most recently requested command is canceled when the cancellation means are operated for a duration shorter than a threshold time, and the touch screen is kept in the active state.

9. The method according to claim 7, wherein the cancellation means are embodied by a cancellation zone of the touch screen.

10. The method according to claim 9, wherein for the first display mode imparting a first visual appearance to a background of the touch screen and the second display mode imparting to the background a second visual appearance different from the first visual appearance, the cancellation zone presents a same visual appearance as the background.

11. The method according to claim 9, wherein the cancellation zone is present in a box that also receives a validation zone.

12. The method according to claim 1, wherein each control zone touched by a person is surrounded with a continuous line in the active state, and each continuous line is deleted on the touch screen passing from the active state to the passive state.

13. The method according to claim 12, wherein the continuous line surrounding the control zone most recently touched by a person is deleted on operating cancellation means.

14. The method according to claim 1 wherein the predetermined period varies as a function of a mission, the mission being selected from a list of missions by a person.

15. The method according to claim 1, wherein the system includes air conditioning equipment and the touch screen has a plurality of control zones including:

a control zone referred to as a "temperature zone" for setting a temperature to be obtained by using the air conditioning equipment;

a control zone referred to as a "ventilation zone" for controlling ventilation produced by the air conditioning equipment; and a control zone referred to as an "operating mode zone" for requesting either manual operation or automatic operation of the air conditioning equipment.

16. A control device for controlling a piece of equipment, the control device comprising a touch screen, the touch screen having at least one touch control zone that generates a command that is sent to the equipment when a person touches the control zone, wherein:

the control device does not have means for locking the touch screen in order to prevent operation of at least one control zone; and the control device includes validation means and a processor unit to execute instructions stored in a storage unit in order to perform the method according to claim 1.

17. A method performed by a system comprising a control device linked to at least one piece of equipment to be controlled, the control device comprising a touch screen, the touch screen being capable of displaying at least one virtual control unit having at least one touch control zone that generates a command that is transmitted to the at least one piece of equipment when a person touches the at least one control zone, wherein:

the touch screen is permanently unlocked so that an operator can generate the command by touching the at least one control zone;

the touch screen is put into a passive state imparting a first display mode to the touch screen when no control zone has been touched by a person;

the touch screen is put into an active state imparting a second display mode distinct from the first display mode to the touch screen when at least one control zone has been touched by a person;

the control device is provided with validation means, and after the touch screen has passed from the passive state to the active state, each requested command is validated jointly when the validation means are operated, the control device transmitting at least one signal to at least one piece of equipment to convey each command;

the touch screen is put into the passive state after the validation means have been operated; and the control device is provided with cancellation means, and after the touch screen has been passed from the passive state to the active state, at least a most recently requested command is canceled when the cancellation means are operated.

18. The method according to claim 17 wherein for the first display mode imparts a first visual appearance to a background of the touch screen, the second display mode imparts to the background a second visual appearance different from the first visual appearance, and each control zone presents a third visual appearance that is different from the first visual appearance of the background.

19. The method according to claim 17 wherein each requested command is canceled when the cancellation means are operated for a duration longer than a threshold time, the touch screen then returning to the passive state.

20. A control device for controlling a piece of equipment, the control device comprising:

a touch screen having at least one touch control zone for generating a command to be sent to the piece of equipment when a person touches the at least one control zone, wherein the touch screen is configured to be permanently unlocked so that an operator can generate the command by touching the at least one control zone; and validation means;

wherein the control device is configured so that:

the touch screen is put into a passive state in which a first display mode is imparted to the touch screen when no control zone has been touched by a person;

the touch screen is put into an active state in which a second display mode distinct from the first display mode is imparted to the touch screen when at least one control zone has been touched by a person;

after the touch screen has passed from the passive state to the active state, each requested command can be validated jointly when the validation means are operated so that the control device can transmit at least one signal to the piece of equipment to convey each command; and the touch screen is put into the passive state after the validation means have been operated;

wherein, in the active state, if no action is taken by the end of a predetermined period, the control device is further configured to automatically cancel each command that has been issued since passing from the passive state to the active state, and to pass the touch screen into the passive state.

* * * * *